United States Patent [19]

Pastva

[11] Patent Number: 4,943,110
[45] Date of Patent: Jul. 24, 1990

[54] CURTAINSIDE TRUCK TRAILER ACCESS SYSTEM AND LOCK ASSEMBLY

[75] Inventor: John V. Pastva, Parma Heights, Ohio

[73] Assignee: The Eastern Company, Cleveland, Ohio

[21] Appl. No.: 298,787

[22] Filed: Jan. 17, 1989

Related U.S. Application Data

[63] Continuation of Ser. No. 53,278, May 21, 1987, abandoned.

[51] Int. Cl.⁵ .............................................. B60J 5/06
[52] U.S. Cl. ................................... 296/181; 296/138; 296/155; 160/196.1; 292/209; 292/218; 292/DIG. 32; 16/87.6 R; 16/106; 16/104; 49/411
[58] Field of Search .............. 296/181, 183, 155, 138; 49/411; 160/196.1; 292/218, 209, DIG. 32; 16/91, 94 R, 97, 104, 87.6 R, 98, 106

[56] References Cited

U.S. PATENT DOCUMENTS

| | | | |
|---|---|---|---|
| 3,464,729 | 9/1969 | Chambers | 292/218 |
| 3,585,674 | 6/1971 | Golden | 16/87.6 R |
| 3,709,552 | 1/1973 | Broadbent | 296/155 X |
| 3,737,183 | 6/1973 | Pasva, Jr. | 292/218 X |
| 3,844,591 | 10/1974 | Velcover | 292/218 X |
| 4,134,281 | 1/1979 | Pelcin | 292/218 X |
| 4,545,611 | 10/1985 | Broadbent | 296/181 |
| 4,668,008 | 5/1987 | Stinson | 296/155 |
| 4,690,442 | 9/1987 | Reynard | 292/218 |
| 4,700,985 | 10/1987 | Whitehead | 296/181 |

FOREIGN PATENT DOCUMENTS

| | | | |
|---|---|---|---|
| 4986 | 12/1955 | Fed. Rep. of Germany | 16/98 |
| 2247379 | 11/1973 | Fed. Rep. of Germany | 296/155 |
| 2745611 | 4/1979 | Fed. Rep. of Germany | 296/155 |
| 2273702 | 2/1976 | France | 296/155 |
| 459954 | 10/1950 | Italy | 160/196 R |
| 163508 | 5/1921 | United Kingdom | 16/98 |
| 1600312 | 10/1981 | United Kingdom | 296/155 |

OTHER PUBLICATIONS

Boalloy, "The First Name in Transport", Jun., 1985.
Railiner, "Railiner Revolutionises Rail Freight".
Boalloy, "Load Hugger Tautliner".
Boalloy, "Tautliner", brochure, May, 1984.
Boalloy, "Insu Liner", brochure.
Boalloy, "Linkliner", brochure.
Boalloy, "Localiner", brochure.
Boalloy, "Commercial Motor Supplement", 1985.
Utility Trailer Mfg. Co., "The Open and Shut Case . . . ", 1985.
Utility Trailer Mfg. Co., "How to Put More Go . . . ", 1986.
Utility Trailer Mfg., "Tarps Not Enough Protection", 1985.
Utility Trailer Mfg., "The Localiner", brochure, 1985.

(List continued on next page.)

*Primary Examiner*—Dennis H. Pedder
*Attorney, Agent, or Firm*—Watts, Hoffmann Fisher & Heinke

[57] ABSTRACT

A system for accessing interior portions of a curtainside truck trailer including a flexible curtain, upper and lower roller assemblies secured to the curtain for engagement with upper and lower rails mounted on the truck trailer for supporting the curtain during expanding and contracting movement along the rails. A support panel is mounted between upper and lower longitudinal edge portions of the truck trailer, and a latching mechanism is connected to the support panel which includes a shaft with a vertical axis of rotation, a latch attached to the shaft engagement with a keeper attached to the curtain. An operating member is attached to the shaft for rotating the shaft about its longitudinal axis and engaging the latch and keeper. A latch guide is captively engaged by the latch and attached to the support panel for guiding movement of the latch into engagement with the keeper. A spring biased locking mechanism for locking the latching mechanism and securing the curtain in the closed position.

5 Claims, 4 Drawing Sheets

OTHER PUBLICATIONS

Utility Trailer Mfg., "Utilitechnics", brochure, vol. III, No. 2, 1986.
Utility Trailer Mfg., "The Standard Utility Tautliner Truck Body".
Utility Trailer Mfg., "Tautliner Trailers", brochure.
Utility Trailer Mfg., "Case History".
Utility Trailer Mfg., "Utilitechnics", vol. III, No. 1, 1986.
Utility Trailer Mfg., "Tautliner Case History".
Allvan Tautliner, "Allvan Tautliner".
Peerless, "New Ideas in Curtainsiders", Sep., 1986.
Miller Trailers, "New Captive Curtainsider Trailer...", adv. Sep., 1986.
Fruehauf, "Fruehauf Sidewinder Express", adv., Jun., 1986.
"British International Motor Show", article, Feb., 1987.
Lawrence David, "Trac-cess LX", brochure.
Lawrence David, "Move Up to Chilled Loads", brochure.
Lawrence David, "Move Up to Trac-Cess", brochure, Jun., 1986.
Lawrence David, "Move Up to Slidax", brochure.
Lawrence David, "Move Up to Roller-Sider", brochure, Oct., 1982.

CURTAINSIDE TRUCK TRAILER ACCESS SYSTEM AND LOCK ASSEMBLY

This application is a continuation of application Ser. No. 053,278 filed May 21, 1987, now abandoned.

TECHNICAL FIELD

The present invention relates to a truck trailer or cargo container access system of the flexible curtain type used to access the interior of a trailer or cargo container along the side for loading or unloading the truck trailer at various locations along the length of the truck trailer.

BACKGROUND ART

Trucks, truck trailers and large shipping or cargo containers are generally of the type having a rectangular configuration with two parallel longitudinal side walls and two end walls. One of the end walls typically includes pivoted double doors to facilitate loading and unloading of the truck trailer compartment. While this type of door is capable of facilitating loading operations, the opening it provides is limited in size to the dimensions of the end wall, and thus is inconvenient for loading certain types of cargo.

Special cargo, or special delivery cargo, also require a greater degree of access to the interior than can be provided by pivoted double doors located on the smaller end wall of the truck trailer. Large heavy cargo, for example, may be difficult to load into the truck trailer via the end wall opening. Where delivery of the cargo is required to be made directly to a construction site or other location where the cargo will be used directly, loading equipment and/or personnel may be sufficiently limited as to make the unloading operation quite difficult. Unloading of bulky cargo from an end wall opening can be difficult even where experienced personnel are available at a designated loading dock with proper equipment, such as a warehouse of other storage facility.

In the past, systems which have been used to provide interior container access via the longitudinal side walls instead of the one end wall, have made use of pivoted single and double doors, as well as doors comprising a flexible curtain. Curtain doors or "curtainside" access systems of the past have consisted of longitudinally as well as vertically moving curtains. While curtainside systems have had the advantage of providing extensive load access to the truck trailer interior, one disadvantage has been inadequate hardware to support and guide the curtains and inadequate security techniques for securing the curtains in a closed position. Another problem with these types of curtainside systems is that they often require the curtain to extend the entire length of the truck trailer.

DISCLOSURE OF THE INVENTION

The present invention provides a new and improved system for accessing interior portions of a truck trailer, truck or cargo container. The term "truck trailer" as used hereinafter is intended to include trucks and cargo containers.

According to the invention, the system includes a flexible panel or curtain which is movably mounted along rails secured to the truck trailer frame adjacent upper and lower longitudinal edge portions of the truck trailer. The curtain forms a wall of the truck trailer and is supported on the truck trailer along upper and lower rails by upper and lower rollers attached to upper and lower longitudinal edges of the curtain. Thus, the curtain can be collapsed or expanded in a horizontal direction to open or close the side of the truck trailer.

Principal features of the system include a novel curtain system whereby a single curtain may be used to cover the truck trailer opening, or, alternatively, multiple curtains may be used which are interconnected by rigid panels extended between the upper and lower edges of the truck trailer.

The system includes improved upper and lower roller assemblies attached to the curtain. The upper roller assembly includes a swivel mechanism and spring support which allows the roller to swivel and permits expansion and contraction of the panel in a vertical direction. The lower roller assembly includes a pair of vertically spaced rollers that engage opposed edges of the lower rail.

A closure mechanism is provided for securing the flexible curtain in the closed position, i.e., expanded condition, and includes a latch mechanism and a keeper, one fixed to the curtain and one fixed to a stationary part of the truck trailer. The latch mechanism includes a vertical rotatable shaft, a latch connected to the shaft, and an operating member connected to the shaft for rotating the shaft to move the latch into engagement with the keeper. In a preferred embodiment, fixed and/or movable support panels are mounted between the longitudinal edges of the truck trailer to support the shaft, and one or more latches are attached to the shaft. One or more keepers may be attached to the curtain, a movable support panel integral with the curtain or to the truck trailer itself. Where the system uses a single flexible curtain, support panels, each having a closure mechanism, may be integral with the curtain, or fixed or movably mounted one at each end of the longitudinal truck trailer wall, and the curtain may thus be secured in the closed position to a support panel or the truck trailer frame. Where multiple curtains are used, support panels having closure mechanisms may be positioned along the truck trailer intermediate the ends of the truck trailer. A latch guide for each latch is attached to the support panel and is captively engaged by the latch to control the path of engagement between the latch and keeper. A spring biased lock or trigger thumb lock mechanism secures the closure mechanism in a closed position by preventing shaft rotation. The latch construction of the closure mechanism is constructed to apply tension to the curtain in a horizontal direction during latching.

The closure mechanism is preferably manufactured to be reversible for operation in either a right or left hand fashion. The mechanism preferably includes two identical latches, each being rotatably connected to the shaft adjacent opposite ends of the shaft by a bracket. Each latch additionally includes an elongated guide aperture for engagement with the latch guide. The keepers are preferably configured to support a vertically extending handle between the keepers.

During a normal curtain closing procedure, the curtain is moved from a contracted position, which allows access to the truck trailer interior, to an expanded curtain position in which the curtain closes the side wall opening. The curtain is moved between positions by an operator grasping the handle mounted on the curtain and pulling the curtain to a substantially closed position. The latches are in an extended position in which they hook onto their associated keepers. The shaft of the latch mechanism is then rotated to tension the curtain and secure the latches to their keepers. To rotate the shaft the operator moves the operating member from a position at right angles with the support panel to a position which is parallel with the support panel. This pulls the latches to a retracted position. The captive engagement of the guide members through the guide apertures in the latches controls the path of travel of the latches such that they are urged into proper engagement with the associated keepers. When the operating member is moved to a position parallel with the panel and the latches and keepers are engaged, it engages the trigger thumb lock member, which maintains the position of the operating member. A cable seal or padlock shackle may then be engaged with the trigger thumb lock to prevent release and movement of the shaft.

In order to access the truck trailer the trigger thumb lock must first be unlocked by removing the padlock and applying pressure to the trigger thumb lock against the bias of the spring. When sufficient pressure is applied the trigger thumb lock releases the operating member from engagement with the trigger thumb lock. The curtain may then be opened by rotating the shaft to extend the latches. During extension, the latches are guided to disengage from the keepers.

These and other features and advantages of the invention will be better understood from the following description of the invention shown in the accompanying drawings.

BEST MODE FOR CARRYING OUT THE INVENTION

Figure 1:
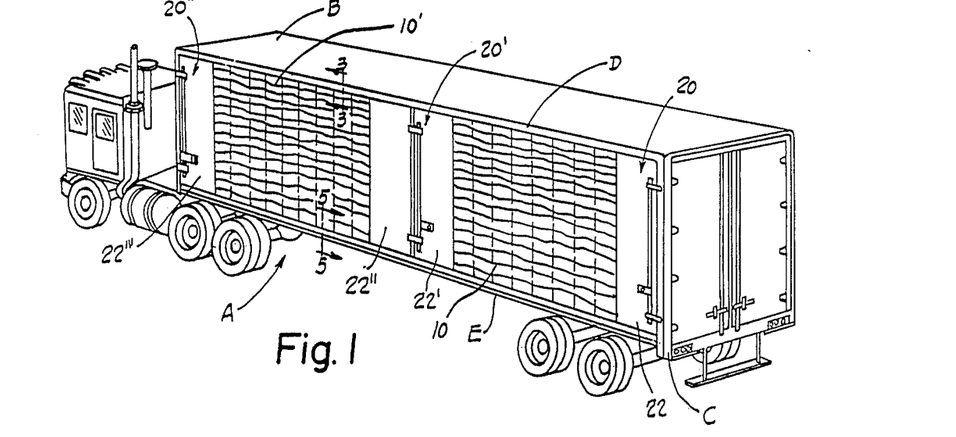
FIG. 1 is a perspective view of a truck trailer showing one embodiment of the truck trailer access system of the present invention.

A preferred embodiment of the truck trailer access system of the present invention is illustrated on a truck trailer in FIG. 1. The access system is shown with multiple flexible panels or curtains 10, 10' covering an opening in a longitudinal side A of the trailer or container B. The curtains 10, 10' are supported on a truck trailer frame C of the trailer B by upper and lower rollers 12, 14 engaged along upper and lower elongate rails 16, 18 secured to upper and lower longitudinal edges D, E of the truck trailer side A.

The system preferably includes latching mechanisms generally designated by reference numerals 20, 20', 20". As shown in FIG. 1 the multiple curtain embodiment of the system includes an intermediate latching mechanism 20' secured to support panels referenced by numerals 22' and 22", which are attached to flexible curtains referenced at 10 and 10'. The support panels are preferably adapted for independent fixed or movable engagement on the truck trailer frame or for interconnection to a vertical edge of the curtain. The latching mechanism of the system is of the type which is reversible for operation at either end of the truck trailer side, in either a right or left handed operating fashion.

As illustrated, one curtain 10 is interconnected with a first support panel 22 having a left hand latching mechanism 20 secured in part to the panel and in part to the truck trailer. The curtain is also interconnected with a second support panel 22' having a right hand latching mechanism 20'. Latching mechanisms secured in part to movable panels may thus be engaged with those portions of the mechanism secured to fixed support panels.

The curtain 10', as a further example, is interconnected with a fixed support panel 22" at one end and with a movable panel 22''' at an opposite end. The movable panel 22''' in part supports a right hand latching mechanism 20" which is also partially engaged with the truck trailer frame. The system could further be arranged with additional fixed support panels whereby the latching mechanism 20, 20" would be supported in part on a movable panel 22, 22''' and in part on additional fixed panels, instead of the truck trailer frame as illustrated in FIG. 1. Since the system is adapted to allow any combination of curtains, support panels, and right or left hand latching mechanisms, and the elements of the system are quite similar except as to reverse/right-left hand construction, only the curtain 10, latching mechanism 20 and support panel 22 will be described in detail.

The curtain may be manufactured from any suitable material such as vinyl, canvas and other flexible water repellant materials. As shown, the curtain may include vertical and/or horizontal stays where there is no support panel interconnected along the curtain edges, stiffening end ribs, not illustrated, may also be used to support elements of the latching mechanism. The support panels are preferably of ply-metal or other suitable steel fabrication material.

Figure 2:
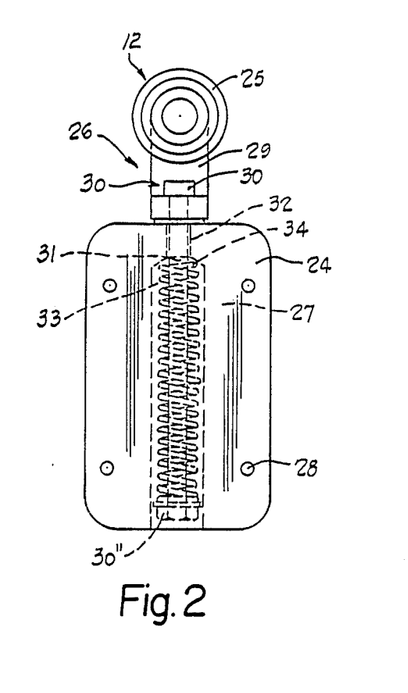
FIG. 2 is a front view of the swivel mechanism used on the upper longitudinal edge of the curtain.
Figure 3:
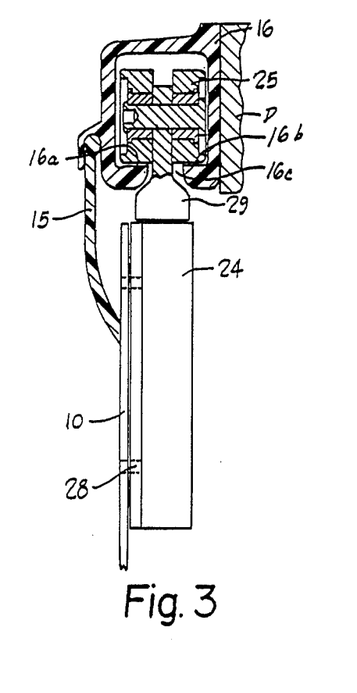
FIG. 3 is a partial sectional view taken along the line 3—3 in FIG. 1.

The curtain 10, shown in the embodiment of FIG. 1 is movably mounted on the truck trailer B by upper and lower rollers 12, 14 engaged along the upper and lower rails 16, 18. As shown in FIGS. 2 and 3, each upper roller 12 comprises a swivel mechanism which includes a housing 24, a rotatable roller 25, structure for securing the roller to the housing 26 and a spring assembly 27. The swivel mechanism is secured to the curtain 10 by conventional members through apertures 28 in the housing 24. The roller 25 is rotatable about a central axis which is generally at right angles with the housing and curtain 10. The roller 25 is connected with the housing and spring assembly by an interconnecting member 29 rotatable about the central axis of the roller, and an elongate fastener 30. The fastener is attached at one end 30' to the interconnecting member 29 and has a body portion 31 which extends into a containment portion 33 of the housing 24 through an access aperture 32. The body portion 31 extends through and along the length of a compression spring 34 within the containment portion. A second end 30" of the fastener spaced from the first secures the spring 34 within the containment portion 33.

FIG. 3 illustrates a roller 25 engaged within the rail 16 which is secured to the upper longitudinal edge D of the truck trailer frame and is preferably an extruded metal track. Each of the rollers 25 rides on and is retained in the rail by lower horizontal inturned rail flanges 16a, 16b spaced laterally in a common plane to form a longitudinal elongate slot 16c opening downwardly and through which the interconnecting member 29 for each roller extends. A gasket 15 engagable with the rail is provided to prevent moisture from entering the truck trailer past an upper edge of the curtain 10.

During movement of the panel 10, the spring assembly of the swivel mechanism enables the housing 24 and spring assembly 27 to swivel relative to the roller 25 and the upper rail 16, and also permits relative movement of the housing 24 and curtain 10 in the vertical direction.

Figure 4:
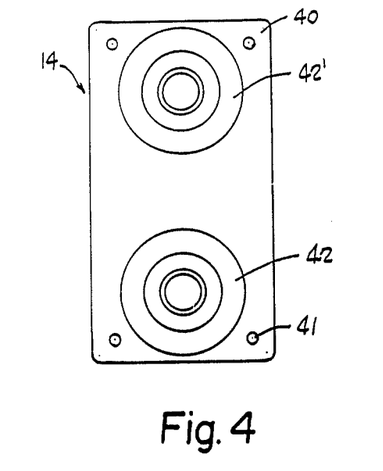
FIG. 4 is a front view of the roller used on the lower longitudinal edge of the curtain.
Figure 5:
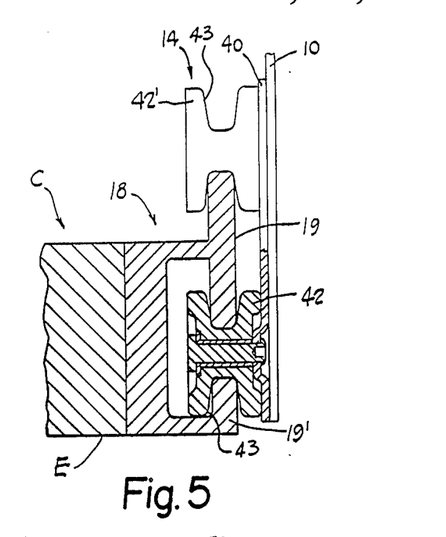
FIG. 5 is a sectional view taken along the line 5—5 in FIG. 1.

As illustrated in FIGS. 4 and 5, the lower roller 14 is secured to the curtain 10 for engagement with the lower rail 18, attached to the lower longitudinal edge E of the frame C. The roller 14 includes a plate 40 having apertures 41 through which the plate is secured to the curtain 10 by conventional fasteners. Each roller member 42, 42' is rotatably attached to the plate 40 about a central axis extending at right angles from the plate, and includes a peripheral groove 43 for receiving rail flanges. As shown in FIG. 5, the lower rail 18 includes an upper flange 19 which has a T-shaped cross-sectional configuration receivable within the peripheral groove 43 of both of the rollers 42, 42'. A lower flange 19' of the rail 18 has an L-shaped cross-sectional configuration engaging only one of the rollers 42. The rail 18 is shown in FIG. 5 supported on the lower longitudinal edge of the truck trailer frame C. The rollers 25, 42, 42', used on both the upper and lower rollers 12, 14 are of the conventional variety rotatable about a central axle using bearing members.

Figures 6, 7:
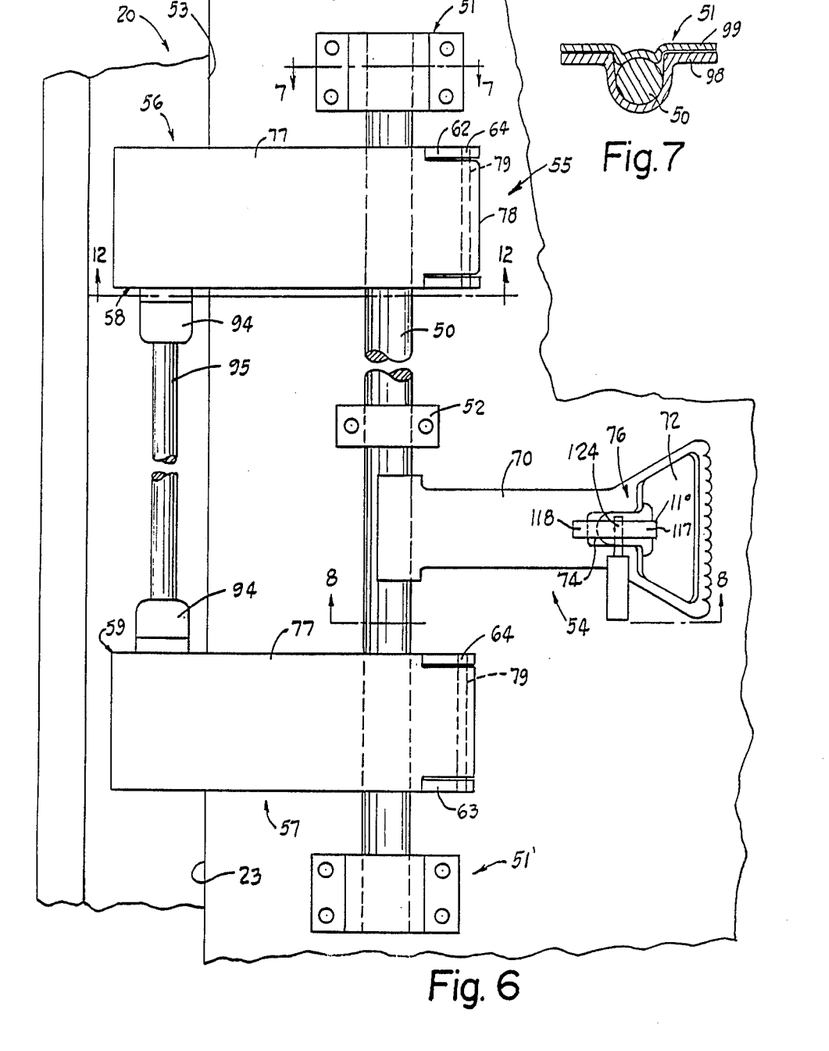
FIG. 6 is a front elevation showing the closure mechanism of the present invention with portions broken away.
FIG. 7 is a sectional view taken along the line 7—7 of FIG. 6.

With reference to FIG. 6, the latching mechanism 20 is illustrated as including a shaft 50 connected to a rigid panel, an operating member 54 for rotating the shaft, a latch assembly 55 and associated keepers 58, 59, the latch assembly and keepers alternately secured to the support panel or to the truck trailer frame, and a trigger thumb lock 76. As shown in the multiple curtain embodiment of FIG. 1 the latching mechanism is constructed to apply tension to the curtain 10 in a horizontal direction as it secures the curtain in a position closing one part of the truck trailer opening.

The shaft 50 of the latching mechanism is rotatably supported against axial movement by a plurality of upper and lower bearing members 51, 51' secured to the support panel. The bearing members 51, 51' preferably include a shaft engagement member 98 and a mounting member 99. As shown in FIG. 7, the bearing members are structured to rotatably secure the shaft 50 between the shaft engagement member 98 and mounting member 99, with the mounting member 99 secured to the support panel 22 between the shaft 50 and the support panel. An intermediate bearing member 52 may also be provided intermediate the two ends of the shaft. The shaft 50 may be rotated about a vertical axis spaced from and parallel with an adjacent longitudinal edge 23 of the support panel 22, using the operating member 54 attached to the shaft at a location convenient to facilitate its rotation by an operator.

Figures 8, 9, 10, 11:
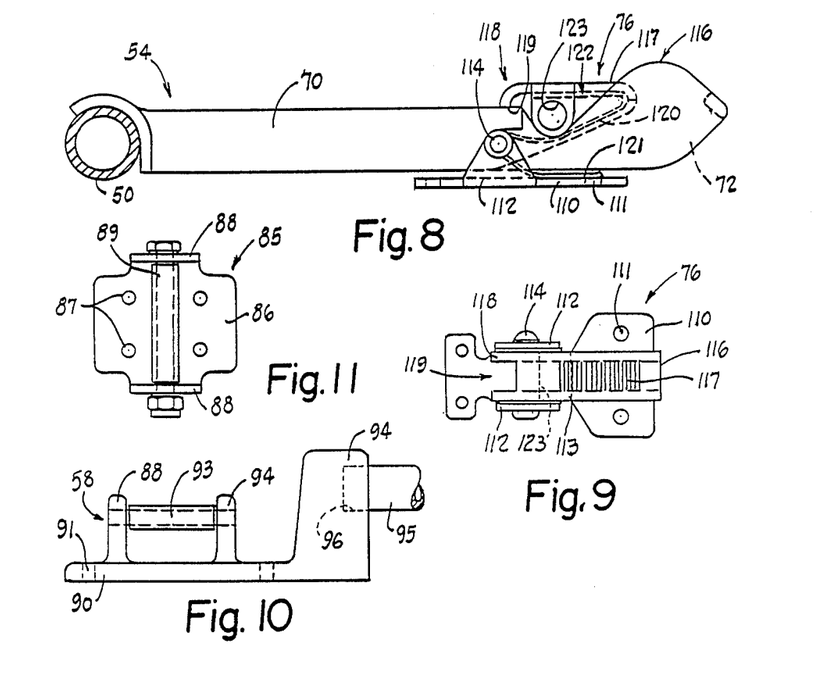
FIG. 8 is a sectional view taken along the line 8—8 of FIG. 6.
FIG. 9 is a front elevation showing the trigger thumb lock of the present invention.
FIG. 10 is a side elevation of the preferred construction of the keeper of the present invention.
FIG. 11 is a front elevation of the latch guide of the present invention.

As shown in FIGS. 6 and 8, the operating member 54 for rotating the shaft 50 includes a strap-like handle portion 70 which is welded to the shaft 50 at one end of the handle portion. The opposite end of the handle portion 70 includes a hand aperture 72 through which the operator's fingers may be extended to hand grasp the operating member. A lock aperture 74 extends from the hand aperture 72 in a direction toward the shaft 50 for engagement with the spring biased trigger thumb lock 76. The trigger thumb lock 76 illustrated in FIGS. 8 and 9 includes a plate 110 having apertures 111 through which the member is attached to the support panel at a location for engagement with the operating member 54 by conventional fasteners. The leg portions 112 extend from the plate in a direction away from the panel. A body portion 113 is pivotally secured about a pivot pin 114 which extends between the leg portions 112, and includes a first end 116 away from the shaft with a finger pressure surface 117, and a second end 118 intermediate the first end 116 and the shaft 50 with an engagement groove 119. A leaf spring 120 is positioned about the pivot pin 114 and engages the plate 110 at a first end 121 and the body portion at a second end 122 as shown in FIG. 8. An aperture 123 extends through the body portion 113, through which a padlock shackle 124 may be extended as shown in FIG. 8. The aperture has a central axis spaced from and parallel with the central axis of the pivot pin 114.

The latch assembly 55 includes one or more latches for engagement with keepers 58, 59. As shown in FIG. 6, the assembly includes upper and lower latches 56, 57, brackets 62, 63.

Figure 12:
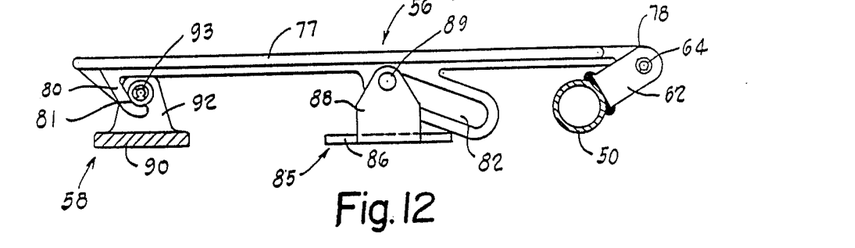
FIG. 12 is a view taken along the line 12—12 of FIG. 6 and shows the latch assembly of the present invention in a latched position.

The upper and lower latches 56, 57 are rotatably interconnected with upper and lower U-shaped brackets 62, 63 which, as shown in FIG. 12, are welded to the shaft 50. As shown in FIG. 6, the latches 56, 57 extend transversely from the brackets 62, 63 and are pivotally secured to the brackets about pins 64, the axes of which are substantially parallel with but offset from the access of the shaft 50. The latches 56, 57 are rotatably operated via the brackets upon rotation of the shaft 50, to cooperate with associated upper and lower keepers 58, 59 which are secured to the curtain or structure integral therewith near an adjacent edge 53 for proper alignment and engagement with the latches 56, 57.

As illustrated in FIG. 6, the latches 56, 57 are identical in construction and preferably include a rectangularly shaped strap like body portion 77, one end of which overlies the shaft 50 and includes a boss portion 78 having an elongate cylindrical passage 79 for engagement by the pin 64. An elongate guiding aperture 82 is positioned on a side of the body portion 77 facing the support panel. The opposite end of the latch has a latch retaining portion 80 which is inturned or projects inwardly toward the shaft 50 for engagement with the associated keeper along a cam surface 81 as shown in FIG. 12. During engagement of the latch and keeper, the retaining portion 80 hooks over and the cam surface 81 engages the keeper.

The latch guide 85, illustrated in FIG. 11, is secured to the support panel at a location for captive engagement with the latch guiding aperture 82. Pivotal movement of the latch upon rotation of the shaft 50 is thus limited by the captive engagement of the latch guide 85 with the guiding aperture 82. The latch guide 85 includes a plate 86 which is secured to the support panel through apertures 87. Leg portions 88 extend from the plate in a direction away from the support panel. A grab member 89 is secured to and positioned between the leg portions and has a central axis which is substantially parallel with but offset from the axis of the shaft 50. The grab member 89 captive within the guiding aperture 82 of the latch, control the rotating movement of the latch as it moves between latched and unlatched positions, and guide the latch to provide proper engagement with the associated keeper.

As shown in FIG. 10, keepers 58, 59 include a plate 90 attached to structure located adjacent the curtain edge 53 through apertures 91. Leg portions 92 extend from the plate in a direction away from the curtain structure. A grab member 93 extends between the leg portions for engagement with the latch retaining portion 80 and has an axis which is substantially parallel with but offset from the axis of the shaft 50. The keepers illustrated in FIGS. 6 and 10 preferably include a handle mount 94 extending outwardly from the plate 90 and having an aperture 96 for engaging a handle 95. The handle 95 comprises a shaft-like member having a central axis spaced from and parallel with the axis of the shaft 50, which extends between the handle mounts 94 engaged in the handle apertures 96 of the upper and lower keepers.

When the curtain 10 is in an open position such that the longitudinal side A of the truck trailer is open for loading and unloading cargo, the curtain is in a contracted or accordian-like position at one end of the opening, or the curtain may be disengaged from the rails.

Figure 13:
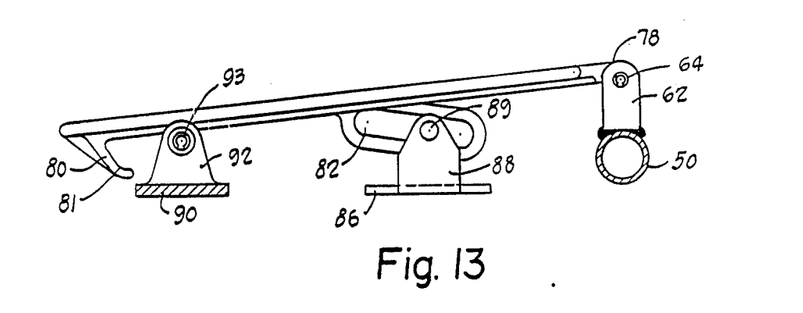
FIG. 13 is a view similar to that of FIG. 12 with the latch assembly in a position intermediate the latched and unlatched positions.
Figure 14:
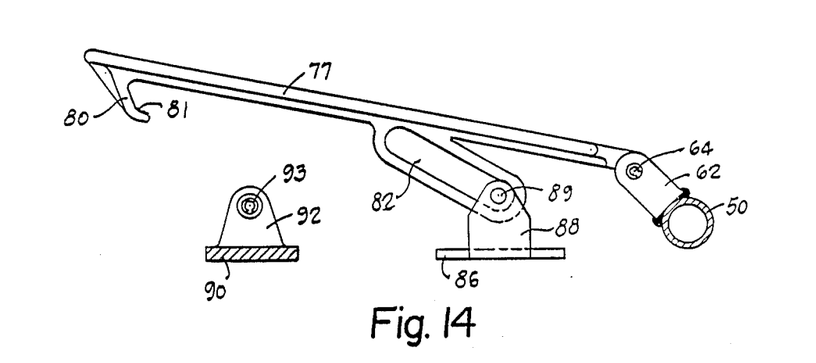
FIG. 14 is a view similar to that of FIG. 12 with the latch assembly shown in the unlatched position.

To move the curtain to an expanded or closed position, the contracted curtain is moved along the rails 16, 18 on a plurality of rollers 12, 14 to a position covering the longitudinal opening of the truck trailer. The curtain is moved along the rails by an operator grasping the handle 95, the shaft 50 of the latching mechanism or any other convenient portion of the curtain, until the edge 53 of the curtain is adjacent the longitudinal edge 23 of the support panel 22 and the truck trailer opening is closed. Once the curtain is in the closed position, the shaft 50 may be rotated using the operating member 54 to engage the upper and lower keepers 58, 59 with the upper and lower latches 56, 57. To move the operating member 54 the operator grasps the handle portion 70 through the hand aperture 72 and rotates the member 54 from a position in which the member is at right angles with the support panel to a position in which the member is parallel with the support panel and the latches 56, 57 are rotated to a retracted position as shown in FIG. 12. Movement of the operating member between the right angle and parallel positions rotates the shaft 50, bracket 63 and latches 56, 57 from the open, unlatched position shown in FIG. 14, through the intermediate position shown in FIG. 13, to the closed, latched position of FIG. 12. The association and engagement of the guiding aperture 82 of the latches and the grab member 87 of the latch guides 85 control the path of travel of the latches so that the latch retaining portion 80 of each is forced to catch the grab member 93 of the keepers along cam surface 81. When the operating member is parallel with the panel and the latches and keepers are engaged, the operating member 54 may be engaged with the trigger thumb lock 76 as in FIG. 8.

To lock the operating member 54 and thereby prevent rotation of the shaft and disengagement of the latches and keepers, the lock aperture 74 of the operating member 54 is engaged with the trigger thumb lock. To engage the members, pressure is applied to the operating member against the trigger thumb lock to overcome the leaf spring biasing the body portion away from the support panel, and move the handle portion 70 past the body portion 113 into association with the engagement groove 119 as shown in FIGS. 6 and 8. Alternatively, pressure may be applied to the first end 116 of the body portion forcing it toward the support panel such that the handle portion 70 may be moved past the body portion and into association with the engagement groove. Once the lock and operating members 76, 54 are engaged, a padlock shackle, cable seal 24 or the like may be engaged through aperture 123 as in FIG. 6 to prevent rotation of the shaft by means of the operating member.

To gain access to the truck trailer interior when the system of the present invention is in the locked position, the padlock shackle is removed from the trigger thumb lock, and pressure is applied to the finger surface 117 of the body portion 113 against the force of the leaf spring 120 to release the operating member from the lock engagement groove 119. The operating member may then be rotated to the right angle position oscillating the shaft to extend the latches and disengage them from the keepers. The curtain may then be moved along the rails to the desired position.

It will be apparent that a novel and improved truck trailer access system has been provided. While preferred embodiments of this invention have been described in detail, it will be apparent that certain modifications or alterations can be made therein without departing from the spirit or scope of the invention set forth in the appended claims.

I claim:

1. A roller mechanism and rail combination of the type used to close a truck trailer opening, said roller mechanism comprising a plate for attachment to a closure panel, top and bottom roller members attached to said plate each rotating about a central axis extending at a right angle from the plate, a peripheral groove in each roller member to receive a rail attached to the truck trailer, said rail comprising a flange T-shaped in cross section extending between the top and bottom roller members and receivable within the peripheral groove of each said roller member and a flange L-shaped in cross section spaced from and parallel with the T-shaped flange and receivable within the peripheral groove of the bottom roller member.

2. A swivel mechanism of the type used to support a closure panel over a truck trailer opening and engaged with a rail member, said mechanism comprising:

a housing attached to the closure panel comprising an access aperture and a containment portion, and a longitudinal spring assembly comprising an elongated fastener and a surrounding compression spring;

a roller rotatable about a central axis at right angles with the housing;

means including an interconnecting member rotatably supporting the central axis of the roller and securing the roller to the housing and spring assembly for relative swivel movement and relative rectilinear movement of the housing and attached panel with respect to the roller and a rail member; and said fastener including a first end attached to the interconnecting member, a body portion extending through the access aperture to the containment portion and along the length of the compression spring located within the containment portion, and a second end spaced from the first end enlarged to confine the compression spring within the containment portion.

3. A roller mechanism and rail combination for supporting a flexible panel having a face for movement into and out of covering relationship with an opening in a longitudinal side wall of a truck trailer, said roller mechanism having (a) a housing comprising a plate and an elongated containment portion having a vertical axis and an aperture, secured to the face of the panel, (b) a spring assembly, (c) a roller having a central axle extending transversely of the vertical axis of the containment portion, and (d) an interconnecting member (i) rotatably supporting the axle, (ii) having a central swivel axis perpendicular to said axle and (iii) secured to the plate and spring assembly by a fastener member that has an elongate body extending into the containment portion through the aperture, in axial alignment with the central swivel axis and engaged with the spring assembly;

said rail member secured along an edge portion of the truck trailer adjacent the opening in the longitudinal side wall and having an elongate retaining means for capturing said roller, the retaining means having an elongate slot providing a downwardly directed opening for receiving the interconnecting member.

4. A truck trailer access system comprising:

a flexible panel mounted for horizontal movement on a truck trailer for allowing access to interior portions of the truck trailer through a longitudinal opening in the truck trailer when the panel is in an open position and preventing access when the panel is in a closed position;

means for supporting the flexible panel between upper and lower longitudinal edges of the truck trailer, said means comprising a stationary mounting member attached to said truck trailer and members attached to said panel and movably engaged with the mounting member; and a latching mechanism for securing and tensioning the flexible panel in the closed position, said latching mechanism comprising a vertical shaft rotatably supported and journaled on one of the truck trailer and a support panel interconnected with the flexible panel, upper and lower ends of the shaft terminating respectively below and above upper and lower edges of the flexible panel, a latch carried by and operable by the shaft, a keeper on the other of the truck trailer and panel, said latch movable by the shaft to engage and disengage with the keeper, said movement including horizontal movement substantially parallel to the direction the flexible panel moves between open and closed positions, to tension the panel in a closed and latched position, latch-guiding structure on the latch and a latch guide attached to the same support panel or truck trailer as the latch for guiding movement of the latch into and out of keeper engagement during rotation of the shaft, an operating handle on the shaft remote from the latch for rotating the shaft, and a spring-biased handle catch attached to said one of said truck trailer and said support panel for engaging and retaining the handle to prevent rotation of the shaft when the latch and keeper are engaged and the panel is tensioned;

said means for supporting the flexible panel including a lower rail and roller assembly that comprises a plate for attachment to the flexible panel, top and bottom roller members attached to said plate each rotating about a central axis extending at a right angle from the plate, a peripheral groove in each roller member to receive a rail attached to the truck trailer, said rail comprising a flange T-shaped in cross section extending between the top and bottom roller members and receivable within the peripheral grooves of said roller members and a flange L-shaped in cross section spaced from and parallel with the T-shaped flange and receivable within the peripheral groove of the bottom roller member.

5. The system of claim 4 wherein said stationary mounting member and each of said members movably engaged include an upper rail and at least one upper roller assembly, respectively;

said upper roller assembly comprising a roller mechanism having a housing comprising a plate and an elongated containment portion having a vertical axis and an aperture, secured to a face of the panel, said roller mechanism including a spring assembly, a roller having a central axle extending transversely of said vertical axis, and an interconnecting member (i) rotatably supporting the axle, (ii) having a central swivel axis perpendicular to said axle, and (iii) secured to the plate and spring assembly by a fastener member having an elongate body extending into the containment portion through the aperture, in axial alignment with the central swivel axis and engaged with the spring assembly;

said upper rail secured along an edge portion of the truck trailer adjacent the opening in the longitudinal side wall and having an elongate retaining means for capturing said roller, the retaining means having an elongate slot providing a downwardly directed opening for receiving the interconnecting member.

* * * * *